(No Model.)
J. B. STONE & J. PENNINGTON.
CAR COUPLING.
No. 350,399. Patented Oct. 5, 1886.
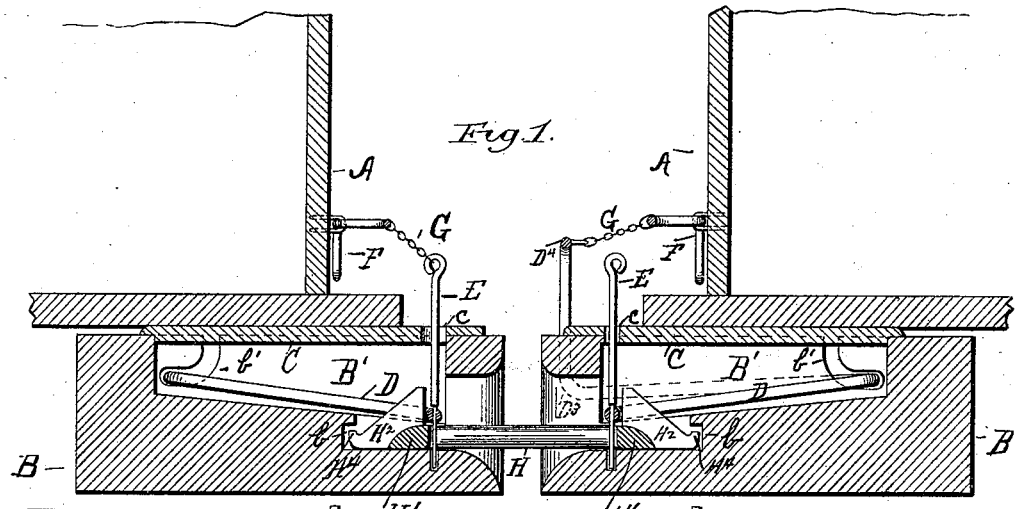
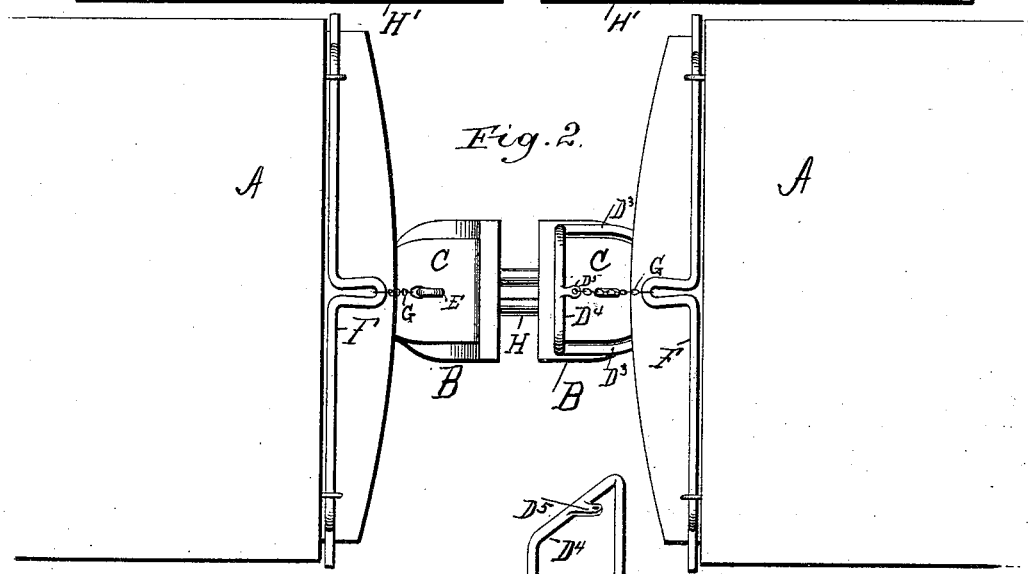
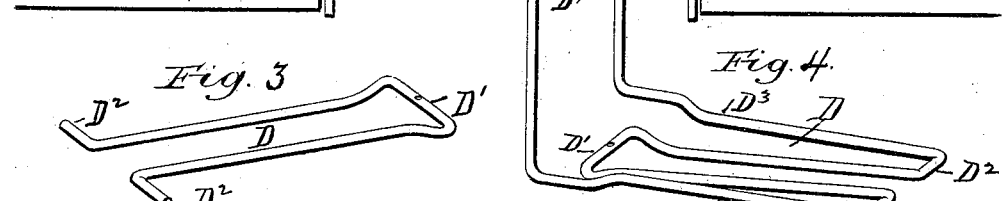
Witnesses: Inventors
John Biddle Stone
John Pennington

UNITED STATES PATENT OFFICE.

JOHN BIDDLE STONE, OF MATHERTON, AND JOHN PENNINGTON, OF PEWAMO, MICHIGAN.

CAR-COUPLING.

SPECIFICATION forming part of Letters Patent No. 350,399, dated October 5, 1886.

Application filed June 4, 1886. Serial No. 204,157. (No model.)

*To all whom it may concern:*

Be it known that we, JOHN BIDDLE STONE, of Matherton, Ionia county, Michigan, and JOHN PENNINGTON, of Pewamo, Ionia county, Michigan, have invented certain new and useful Improvements in Car-Couplings, of which the following is a specification, reference being had to the accompanying drawings, forming part thereof, and in which—

Figure 1 represents in sections portions of cars with our improved coupling applied thereto, the right-hand portion of the figure showing a modified form of latch. Fig. 2 is a plan view of the devices shown in Fig. 1. Fig. 3 is a perspective view of the latch. Fig. 4 is a similar view of the modified form of latch, and Fig. 5 is a perspective view of the link common to both forms of latch.

The invention consists in the construction and arrangement of parts, as will be hereinafter fully described and claimed.

A A represent portions of cars to which the draw-heads B B are secured in any suitable manner. The draw-heads have the usual flaring mouths, and are formed with recesses B', opening upward in rear of the mouths. The bottoms of the recesses B' B' have recessed shoulders $b\ b$, as shown in Fig. 1, and the side walls of the recesses, at their rear ends, have open bearings $b'$, leading from the upper edges of said side walls. The draw-heads are further provided with rabbeted covers or top plates, C C, to close the top of recesses B' B', and bearing $b'\ b'$, the forward ends of the covers being apertured at $c\ c$ for the coupling-pins. Within the recesses B' B' are placed the U-shaped latches D D, which have cross-pieces D' at their outer ends, their inner ends being extended outward to form pivots $D^2$, which rest in the bearing $b'$ and are held from displacement by the covers C C. Coupling-pins E extend down through the openings $c\ c$ in the covers and through apertures in the cross-pieces D' of the latches, shoulders being formed in the said pins above the cross-pieces. In the left-hand coupling the pin E is secured to the cross-piece D', or formed integral with the latch, so that when raised the latch will be raised also; but in the modified form the pin passes loosely through the aperture in the cross-piece, so that it may be operated without operating the latch, the latter being provided with side arms, $D^3$, connected with its pivots $D^2\ D^2$, and extending forward and upward therefrom, and connected by a cross-piece, $D^4$, having an apertured lug, $D^5$. Levers F are pivoted to the ends of the cars and have operating-handles at their ends. A short chain, G, connects the pin E of the left-hand coupling with the pin F, while in the modified form the chain F connects the lever with the latch through the medium of the apertured lug $D^5$, so that in each instance by operating the lever the latch and pin will both be raised, while in the modified form the pin E may be separately operated without raising the latch.

H represents the link, which is slotted between its end cross-pieces, H', to receive the ends of the coupling-pins which pass therethrough into sockets in the draw-heads, as shown in Fig. 1. From the cross-pieces H' project the inclined projections $H^2\ H^2$, which are separated by slots, to allow the lower ends of the coupling-pins to pass through and drop behind the cross-pieces of the links, the cross-pieces D' of the latches falling behind the shoulders $H^3$ formed by the rear vertical faces of the projections $H^2$. The forward ends of the projections $H^2$ terminate in lugs $H^4$, which engage the recessed shoulders $b$ in the draw-heads, to prevent the links from being thrown upward by the sudden jarring of the cars.

The parts as will be seen may be readily replaced in case repair is necessary, and no springs are required, and the strain on the coupling-pins is relieved by the latches D.

Having thus described our invention, what we claim as new, and desire to secure by Letters Patent, is—

1. The combination, with the draw-head B, having a recess, B', of the latch D, provided with pivots $D^2$ at its rear end, a cross piece, D', at its forward end, and the coupling-pin E, projecting above and below the cross-piece D', substantially as set forth.

2. The combination, with the draw-head B, having a recess, B', and bearings $b'$, of the latch D within the recess, and provided with cross-piece D', pivots $D^2$, passing through the bearings $b'$, arms $D^3$, extending forward and upward from the pivots $D^2$ at the outside of the draw-head, and connected by the apertured cross-piece D', and the pin E, extending down through the said aperture, substantially as set forth.

3. The combination, with the draw-head having the recess B', and the shouldered recess $b$ in the bottom thereof, and the coupling-pin, of the link H, having cross-pieces H', having inclined projections at its opposite ends terminating in the lugs $H^4$, adapted to engage said shouldered recess, substantially as set forth.

4. The combination, with the draw-head B, having the recess B' open at its top, the open bearings $b'$, leading from the upper edges of the side walls of the said recess, the latch D, having pivots in said bearings, and the coupling-pin, of the cover C, closing the recess B, and bearings $b'$, and provided with aperture $c$ for the coupling-pin, substantially as set forth.

5. The combination, with the draw-head B, having recess B', having bearings $b'$ in its side walls and shouldered recess $b$ in its bottom, of the latch D within the recess B', and provided with pivots $D^2$ and cross-piece D', the coupling-pin E, extending above and below the said cross-piece, the link H, having end cross-pieces H', inclined projections $H^2$, forming vertical shoulders $H^3$ and terminating in the lugs $H^4$, and means for operating the latch and pin, substantially as and for the purpose set forth.

6. The link H, formed with the end cross-pieces H', the inclined projections $H^2$ at its opposite ends, forming shoulders $H^3$, and terminating in the lugs $H^4$ $H^4$, substantially as set forth.

Witness our hands and seals this 7th day of April, 1886.

JOHN BIDDLE STONE. [L. S.]
JOHN PENNINGTON. [L. S.]

Witnesses:
A. W. SHERWOOD,
F. C. HATHAWAY.